(12) United States Patent
Miyanabe et al.

(10) Patent No.: US 7,009,922 B2
(45) Date of Patent: Mar. 7, 2006

(54) CROSS-TALK REMOVAL APPARATUS AND DATA REPRODUCTION APPARATUS

(75) Inventors: Shogo Miyanabe, Tsurugashima (JP); Hiroki Kuribayashi, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 738 days.

(21) Appl. No.: 10/105,946

(22) Filed: Mar. 26, 2002

(65) Prior Publication Data

US 2002/0159313 A1 Oct. 31, 2002

(30) Foreign Application Priority Data

Apr. 27, 2001 (JP) .......................... P2001-131620

(51) Int. Cl.
*G11B 20/24* (2006.01)
(52) U.S. Cl. .................. 369/47.17; 369/53.33
(58) Field of Classification Search ............. 369/47.17, 369/53.33
See application file for complete search history.

(56) References Cited

U.S. PATENT DOCUMENTS

| 5,166,914 | A | * | 11/1992 | Shimada et al. | ......... 369/47.17 |
| 5,835,467 | A | * | 11/1998 | Tomita et al. | ........... 369/53.33 |
| 6,687,204 | B1 | * | 2/2004 | Miyanabe et al. | ....... 369/47.17 |

* cited by examiner

*Primary Examiner*—David Hudspeth
*Assistant Examiner*—Adam R. Giesy
(74) *Attorney, Agent, or Firm*—Drinker Biddle & Reath LLP (57) ABSTRACT

In a cross-talk canceller (CTC) that removes the cross-talk from the adjacent tracks that is contained in the reproduction signal from the main track, a sample-value series S1' for the reproduction signal from the adjacent track is input to a correlation-detection unit to find its correlation with the signal pattern of the signal output from the CTC that is detected by a pattern-detection unit, and then it passes through one of the correction-coefficient units that is connected by the switch and then integrated by the integrator, and the tap coefficient used by the variable filter of the CTC is obtained to a narrow control frequency zone.

10 Claims, 4 Drawing Sheets

CROSS-TALK REMOVAL APPARATUS AND DATA REPRODUCTION APPARATUS

BACKGROUND OF THE INVENTION

1. Field of the Invention

This invention relates to a cross-talk removal apparatus, which removes cross-talk from adjacent tracks contained in the reproduced signal of a main track based on reproduction signals from the main track and from both adjacent tracks of a data recording medium; and to a data reproduction apparatus that uses the cross-talk removal apparatus when reproducing data from a data-recording medium that has tracks.

2. Description of the Related Art

In the case of a large-capacity data-recording medium such as DVD, there is a problem in that cross-talk from adjacent tracks affects the reproduction signal from the main track being reproduced and causes the reproduction quality to decrease. In order to solve this problem, a cross-talk canceller has gained much attention, in which three light beams are used to simultaneously reproduce three adjacent tracks in order to obtain false cross-talk from the reproduction signals of the adjacent tracks, and then the cross-talk is removed by subtracting this cross-talk from the reproduction signal from the main track.

This kind of cross-talk canceller irradiates three light beams on the main track and both adjacent tracks and removes the cross-tack according to the respective reproduction signals. In order to do this, the cross-talk component is extracted by filtering the reproduction signals of the two adjacent tracks using a digital filter having a variable tap coefficient. This cross-talk canceller must adaptively control the aforementioned tap coefficient in order to follow changes in the cross-talk. This makes it possible to use an optimum tap coefficient to properly remove the cross-talk from the reproduction signal and to maintain the reproduction quality.

Recently, writable data-recording media such as DCD-RAM has become widely used. Normally, in the case of data-recording media such as DVD-RAM it is assumed that the recorded areas and non-recorded areas mixed together, so data are not necessarily recorded on the adjacent tracks when reproducing the data on the main track. When there are no data recorded on the adjacent tracks, there is no cross-talk between the adjacent tracks and the main track, however, when changing from having no data recorded on the adjacent tracks to having data recorded, cross-talk between the adjacent tracks and the main track occurs suddenly. In order to stably remove the cross-talk that corresponds to this kind of change, it is preferred that the tap coefficient of the cross-talk canceller be made to follow the change.

However, since the control frequency zone is somewhat narrow, control of the tap coefficient of the cross-talk canceller requires time in order to converge. Normally, the control frequency zone for the tap coefficient is set to be equal to or double the rpm of the disk. This is because when the control frequency zone for the tap coefficient is widened, the effects due to defects during reproduction are received, and there is a possibility that the cross-talk canceller will malfunction. Therefore, it is not possible to widen the control frequency zone for the tap coefficient and quickly change the characteristics of the cross-talk canceller even though the adjacent tracks changed from a state of having no data recorded to a state of having recorded data. As a result, it is not possible to sufficiently remove the cross-talk in the starting section of the recorded area, and thus it is not possible to maintain good reproduction quality.

SUMMARY OF THE INVENTION

Taking into consideration the problems described above, it is the object of this invention to provide a cross-talk removal apparatus and data reproduction apparatus that are capable of quickly removing cross-talk by switching the tap coefficient of a variable filter, while at the same time obtaining a good reproduction signal, when reproducing data from a recordable data-recording medium, even though there are no data recorded on the adjacent tracks.

The above object of the present invention can be achieved by the cross-talk removal apparatus of the present invention. The cross-talk removal apparatus that removes cross-talk from one or the other or both adjacent tracks, which is contained in the reproduction signal from a main track on a data-recording medium that is to be reproduced, based on the reproduction signal from said main track and the reproduction signals from said one or the other or both adjacent tracks and is provided with: a cross-talk removal device of using a variable filter with a controllable coefficient to extract the cross-talk from the reproduction signal of said one or the other or both adjacent tracks and removing said cross-talk from the reproduction signal of said main track; a coefficient control device of controlling the coefficient of said variable filter using a changeable control frequency zone; and a control frequency zone setting device of determining the recording state of said one or the other or both adjacent tracks and switching said control frequency zone according to said recording state.

According to the present invention, the cross-talk, which is extracted according to the reproduction signals from the main track and both adjacent track when reproducing data on the data-recording medium, is removed. In order to remove the cross-talk, a variable filter is used whose tap coefficient is adaptively controlled. Moreover, when controlling the coefficient of the variable filter, the control frequency zone is switched according to the recording state of the adjacent tracks. Therefore, in the case that there are adjacent tracks on which no data are recorded mixed with adjacent tracks on which data are recorded, it is possible to change the control frequency zone over time in order to adequately correspond with the changes in cross-talk. Therefore, for the variable filter that is used when removing cross-talk the coefficient can be controlled such that there is balance between followability and stability in cross-talk removal.

In one aspect of the present invention can be achieved by the cross-talk removal apparatus of the present invention. The control frequency zone setting device sets said control frequency zone to be wide for a specified period of time when the recording state of said one or the other or both adjacent tracks changes from an non-recorded state to a recorded state.

According to the present invention, when it is determined during removal of cross-talk that there are no data recorded on the adjacent tracks at a specified time, and then it is determined that there are data recorded, the control frequency zone for controlling the coefficient of the variable filter is switched such that it is wide, and that state is maintained for a specified period. Therefore, when the state changes suddenly from a state of no cross-talk to a state of increasing cross-talk, the speed of convergence of the coefficient is increased making it possible to quickly remove the cross-talk, and since there is control that restores the state after becoming stable, it is possible to suppress effects due to defects.

In another aspect of the present invention can be achieved by the cross-talk removal apparatus of the present invention. the coefficient control device is capable of switching said control frequency zone between a first control frequency zone and a second control frequency zone that is wider than said first control frequency zone, and wherein, the control frequency zone setting device normally sets said first control frequency zone, and sets said second control frequency zone for a specified period of time when the recording state of the one or the other or both adjacent tracks changes from an non-recorded state to a recorded state.

According to the present invention, control is performed such that normally a narrow first control frequency zone is set when removing the cross-talk, and at the timing when the adjacent tracks change from a state of having no data recorded to a state having data recorded, the control frequency zone switches to a wide second control frequency zone, and after that state has been maintained for a specified time period, the control frequency zone returns to the first control frequency zone. Therefore, it is possible to selectively set the second control frequency zone temporarily at timing when there is a need to increase the speed of convergence of the coefficient, and this it is possible to quickly remove the cross-talk using simple construction, while at the same time suppress effects due to defects as described above.

In further aspect of the present invention can be achieved by the cross-talk removal apparatus of the present invention. The specified period of time is the time required for said coefficient to converge when said second control frequency zone has been set.

According to the present invention, control is performed such that when the control frequency zone has been switched and set to the second control frequency zone, that state is maintained just long enough for the coefficient to converge, so it is possible for the coefficient to converge quickly, and after the coefficient has become stable, it is possible to set the best control frequency zone for preventing malfunction.

In further aspect of the present invention can be achieved by the cross-talk removal apparatus of the present invention. The control frequency zone setting device determines the recorded state and non-recorded state based on the amplitude of the reproduction signals from said one or the other or both adjacent tracks.

According to the present invention, whether or not there are data recorded on the adjacent tracks is determined according to the amplitude of the reproduction signal obtained from the adjacent tracks when removing cross-talk, and the control frequency zone is set as described above to correspond to the judgment results, so it is possible to accurately and quickly determine the recording state of the adjacent tracks and properly set the control frequency zone.

In further aspect of the present invention can be achieved by the cross-talk removal apparatus of the present invention.

The control frequency zone setting device sets said control frequency zone to zero when the recording state of said one or the other or both adjacent tracks changes from a recorded state to a non-recorded state.

According to the present invention, when it is determined at a specified time when removing cross-talk that there are data recorded on the adjacent tracks and then next it is determined that there are no data recorded, the control frequency zone for the coefficient of the variable filter is switched to and set to zero. Therefore, when then are no data recorded on the adjacent tracks, the cross-talk removal operation ends, making it possible to effectively prevent malfunction due to effect of defects.

The above object of the present invention can be achieved by the data reproduction apparatus of the present invention. The data reproduction apparatus that reproduces recorded data from a data-recording medium on which tracks are formed and is provided with: a reproduction device of generating a reproduction signal for a main track to be reproduced and the reproduction signals of one or the other or both adjacent tracks based on light that is reflected when said main track and said one or the other or both adjacent tracks are irradiated with a light beam; a cross-talk removal device of using a variable filter with a controllable coefficient to extract the cross-talk from the reproduction of said one or the other or both adjacent tracks and removing said cross-talk from the reproduction signal of said main track; a coefficient control device of controlling the coefficient of said variable filter using a changeable control frequency zone; and a control frequency zone setting device of determining the recording state of said one or the other or both adjacent tracks and switching said control frequency zone according to said recording state.

In one aspect of the present invention can be achieved by the cross-talk removal apparatus of the present invention. The control frequency zone setting device sets said control frequency zone to be wide for a specified period of time when the recording state of said one or the other or both adjacent tracks changes from an non-recorded state to a recorded state.

According to the present invention, when it is determined during removal of cross-talk that there are no data recorded on the adjacent tracks at a specified time, and then it is determined that there are data recorded, the control frequency zone for controlling the coefficient of the variable filter is switched such that it is wide, and that state is maintained for a specified period. Therefore, when the state changes suddenly from a state of no cross-talk to a state of increasing cross-talk, the speed of convergence of the coefficient is increased making it possible to quickly remove the cross-talk, and since there is control that restores the state after becoming stable, it is possible to suppress effects due to defects.

In another aspect of the present invention can be achieved by the cross-talk removal apparatus of the present invention. The coefficient control device is capable of switching said control frequency zone between a first control frequency zone and a second control frequency zone that is wider than said first control frequency zone, and wherein The control frequency zone setting device normally sets said first control frequency zone, and sets said second control frequency zone for a specified period of time when the recording state of said one or the other or both adjacent tracks changes from an non-recorded state to a recorded state.

According to the present invention, control is performed such that normally a narrow first control frequency zone is set when removing the cross-talk, and at the timing when the adjacent tracks change from a state of having no data recorded to a state having data recorded, the control frequency zone switches to a wide second control frequency zone, and after that state has been maintained for a specified time period, the control frequency zone returns to the first control frequency zone. Therefore, it is possible to selectively set the second control frequency zone temporarily at timing when there is a need to increase the speed of convergence of the coefficient, and this it is possible to quickly remove the cross-talk using simple construction, while at the same time suppress effects due to defects as described above.

In further aspect of the present invention can be achieved by the cross-talk removal apparatus of the present invention. The specified period of time is the time required for said coefficient to converge when said second control frequency zone has been set.

According to the present invention, control is performed such that when the control frequency zone has been switched and set to the second control frequency zone, that state is maintained just long enough for the coefficient to converge, so it is possible for the coefficient to converge quickly, and after the coefficient has become stable, it is possible to set the best control frequency zone for preventing malfunction.

In further aspect of the present invention can be achieved by the cross-talk removal apparatus of the present invention. The control frequency zone setting device determines the recorded state and non-recorded state based on the amplitude of the reproduction signals from said one or the other or both adjacent tracks.

According to the invention, whether or not there are data recorded on the adjacent tracks is determined according to the amplitude of the reproduction signal obtained from the adjacent tracks when removing cross-talk, and the control frequency zone is set as described above to correspond to the judgment results, so it is possible to accurately and quickly determine the recording state of the adjacent tracks and properly set the control frequency zone.

In further aspect of the present invention can be achieved by the cross-talk removal apparatus of the present invention. The control frequency zone setting device sets said control frequency zone to zero when the recording state of said one or the other or both adjacent tracks changes from a recorded state to a non-recorded state.

According to the present invention, when it is determined at a specified time when removing cross-talk that there are data recorded on the adjacent tracks and then next it is determined that there are no data recorded, the control frequency zone for the coefficient of the variable filter is switched to and set to zero. Therefore, when then are no data recorded on the adjacent tracks, the cross-talk removal operation ends, making it possible to effectively prevent malfunction due to effect of defects.

DESCRIPTION OF THE PREFERRED EMBODIMENT

The preferred embodiment of the invention is explained below based on the drawings. In this embodiment, the case of applying the invention to a data reproduction apparatus that has a cross-talk removal apparatus and which reproduces an optical disk in DVD format and outputs the user data is explained.

Figure 1:
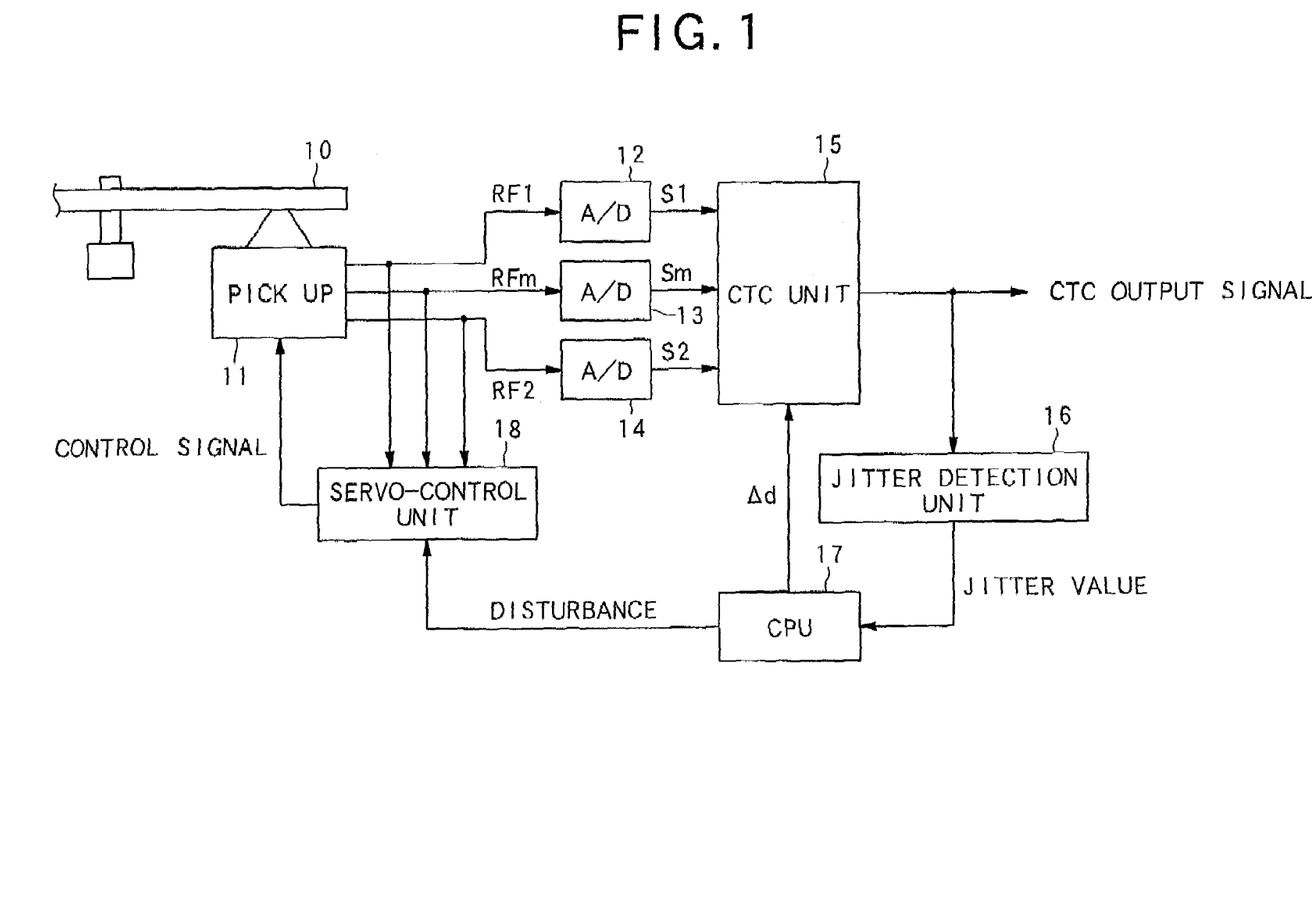
FIG. 1 is a block diagram explaining the main construction of the data reproduction apparatus of an embodiment of the invention.

FIG. 1 is a block diagram explaining the main construction of the data reproduction apparatus of this embodiment. The data reproduction apparatus shown in FIG. 1 comprises a pick up 11, A/D converters 12 to 14, CTC (Cross-Talk Canceller) unit 15, and CPU 16, and it reproduces user data that are recorded on the inserted disk 10.

In the aforementioned construction, it is assumed that a writable DVD disk such as DVD-RAM is used as the disk 10. Therefore, the tracks on the disk 10 have areas that have recorded data mixed with areas that do not have recorded data. In this case, it is necessary to control switching the control frequency zone of the cross-talk canceller as will be described below as a measure against sudden changes in the effect of cross-talk from adjacent tracks.

The pick up 11 irradiates light beams onto the tracks of the rotating disk 10, and generates a detection signals based on the reflected light. Also, in this embodiment, three light beams from the pick up 11 are irradiated onto three adjacent tracks of the disk 10, and by removing the cross-talk between the main track being reproduced and the adjacent tracks, the reproduction quality is improved.

Figure 2:
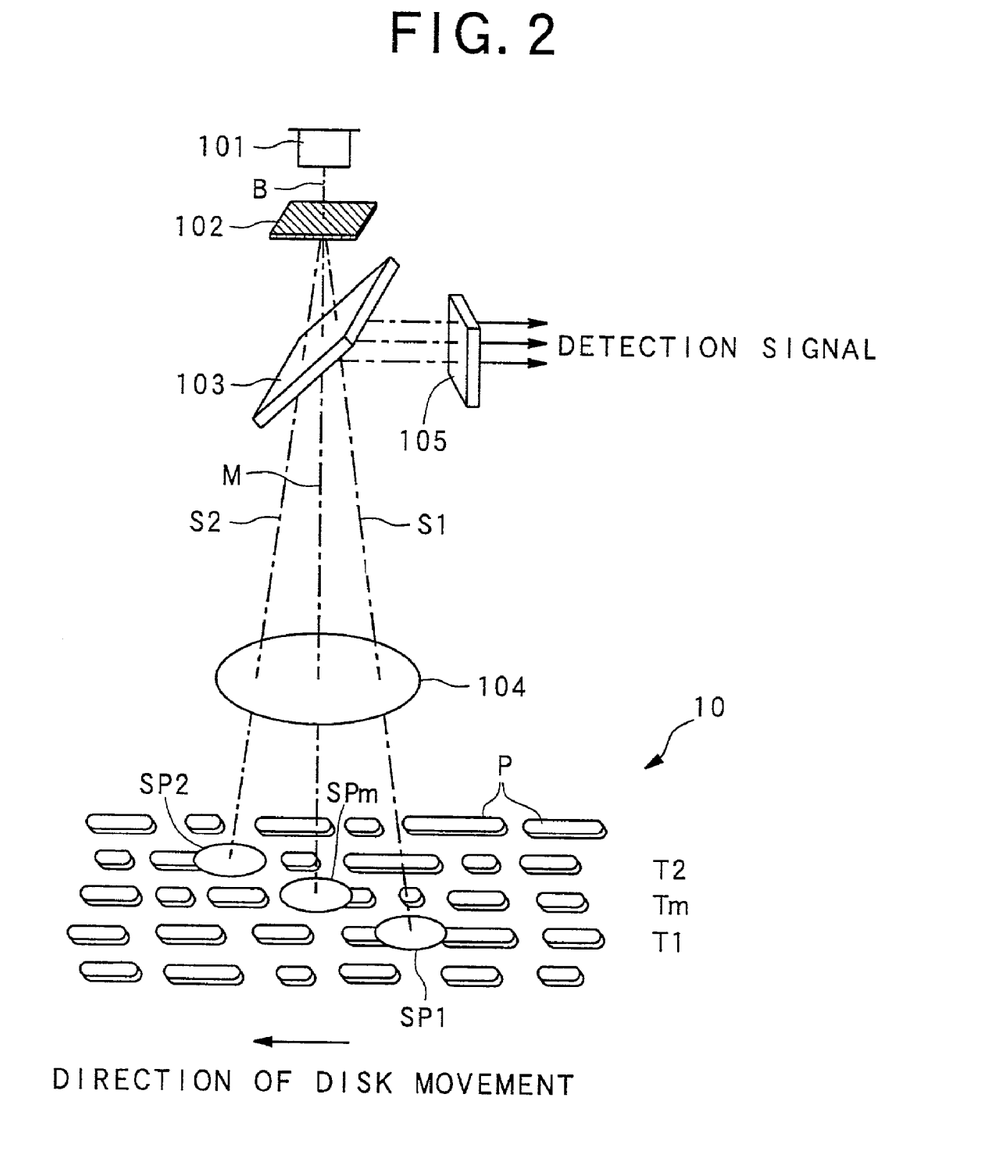
FIG. 2 is a drawing showing the optical system of the pick up and the irradiation state of the light beams for removing cross-talk.

FIG. 2 shows the optical system of the pick up 11 and the irradiation state of the light beams on the disk 10 for removing cross-talk. As shown in FIG. 2, the optical system of the pick up 11 comprises: a laser 101, diffraction grating 102, beam splitter 103, object lens 104 and photo detector 105.

As shown in FIG. 2, in order to correspond to the land-group recording format that is used for DVD-RAM, land tracks L and group tracks G having different heights are alternately formed on the data-recording surface of the disk 10. Normally, recording to the disk is performed based on the phase-change method, and the crystal state and reversible change of the recording material are used. When writing to the disk 10 a recording mark M is formed on the land track L or group track G. When it is possible to record to both land tracks L and G tracks on the disk 10 in this way, cross-talk from the adjacent tracks increases, so the need for the cross-talk canceller also increases.

The example of FIG. 2 shows the state where there is a partially recorded area having recording mark M on adjacent track T1. In other words, with DVD-RAM it is possible to record at an arbitrary recording position, so it can be assumed that there are recorded areas mixed with non-recorded areas. In this case, cross-talk increases suddenly during transition of the adjacent track T1 or T2 from a non-recorded state to a recorded state while tracing the main track Tm and becomes a problem, however, this embodiment handles this problem with the method described below.

In FIG. 2, the light beam B that is projected from the laser 101 is separated into a main light beam Bm and two sub beams B1, B2 by the diffraction grating 102. These three beams pass through the beam splitter 103 and are irradiated onto the three adjacent tracks on the data-recording surface of the disk 10 via the object lens 104. The main beam Bm is irradiated onto the main track Tm and forms a beam spot SPm. Also, one of the sub beams B1 is irradiated onto the track T1 that is adjacent to the main track Tm and forms a beam spot SP1, and the other sub beam B2 is irradiated onto the other track T2 that is adjacent to the main track Tm and forms a beam spot SP2. In FIG. 2, the main track Tm is the group track G, and the adjacent traces T1, T2 are land tracks L.

The light that is reflected from the beam spot SPm from the main beam Bm and the light that is reflected from the beam spits SP1, SP2 from the sub beams B1, B2 pass through the object lens 104 and are reflected by the beam splitter 103 and received by the photo-detector 105. The photo-detector has a divided shape and the respective reflected light beams are converted photo-electrically and output as detection signals. The reproduction signal RFm (see FIG. 1) for the main track Tm and the reproduction signals RF1, RF2 (see FIG. 1) for the two adjacent tracks T1, T2 are generated based on the detection signals. The reproduction signals RF1, RF2 of the two adjacent tracks T1, T2 become necessary when removing the cross-talk component that is contained in the reproduction signal Rm of the main track Tm.

In FIG. 2, it is preferred that the beam spot SPm from the main beam Bm and the beam spots SP1, SP2 from the two sub beams B1, B2 be arranged in a straight line in the radial direction of the disk, however, since the track pitch of the disk 10 is narrow, light reflected from each beam spot must be received separately by different detectors, so as shown in FIG. 2, each of the beam spots SPm, SP1, SP2 are arranged in a diagonal straight line at specified intervals in the tangential direction of the tracks. Therefore, delays that corresponds to the intervals in the tangential direction of the disk between the beam spots SPm, SP1, SP2 occur in the three reproduction signals RFm, RF1, RF2. These delays are corrected by the cross-talk canceller as described later.

Next, as shown in FIG. 1, the reproduction signals RFm, RF1, RF2 that are output from the pick up 11 are supplied to the A/D converters 12 to 14. The A/D converter 13 samples the reproduction signal RFm from the main track Tm and generates a sample-value series Sm. Also, the A/D converter 12 samples the reproduction signal RF1 from one adjacent track T1 and generates a sample-value series S1, and A/D converter 14 samples the reproduction signal RF2 from the other adjacent track T2 and generates a sample-value series S2. Each of the respective sample-value series Sm, S1, S2 that are generated by the A/D converters 12 to 14 are supplied to the CTC unit 15.

As the means for removing cross-talk, the CTC unit 15 performs specified operations on the aforementioned sample-value series Sm, S1, S2, and generates a CTC output signal from which the effects of cross-talk due to the adjacent tracks has been removed. The CTC unit 15 is construction such that it can correct the delays that exist between each of the reproduction signals RFm, RF1, RF2. Details of the construction and operation of the CTC unit 15 will be described later.

The CPU 16 functions as the means for performing overall control of the reproduction operation of the data reproduction apparatus. The CPU 16 controls the operation of the CTC unit 15, and sets the optimum delay amount, which was found based on the jitter value for example, for the CTC unit 15. Also, the CPU 16 references the signal detection results from the CTC unit 15, and sends a switching instruction to the CTC unit 15 to switch the control frequency zone according to whether or not there is a signal on the disk 10. Control of the CTC unit 15 for switching the control frequency zone will be described later.

Figure 3:
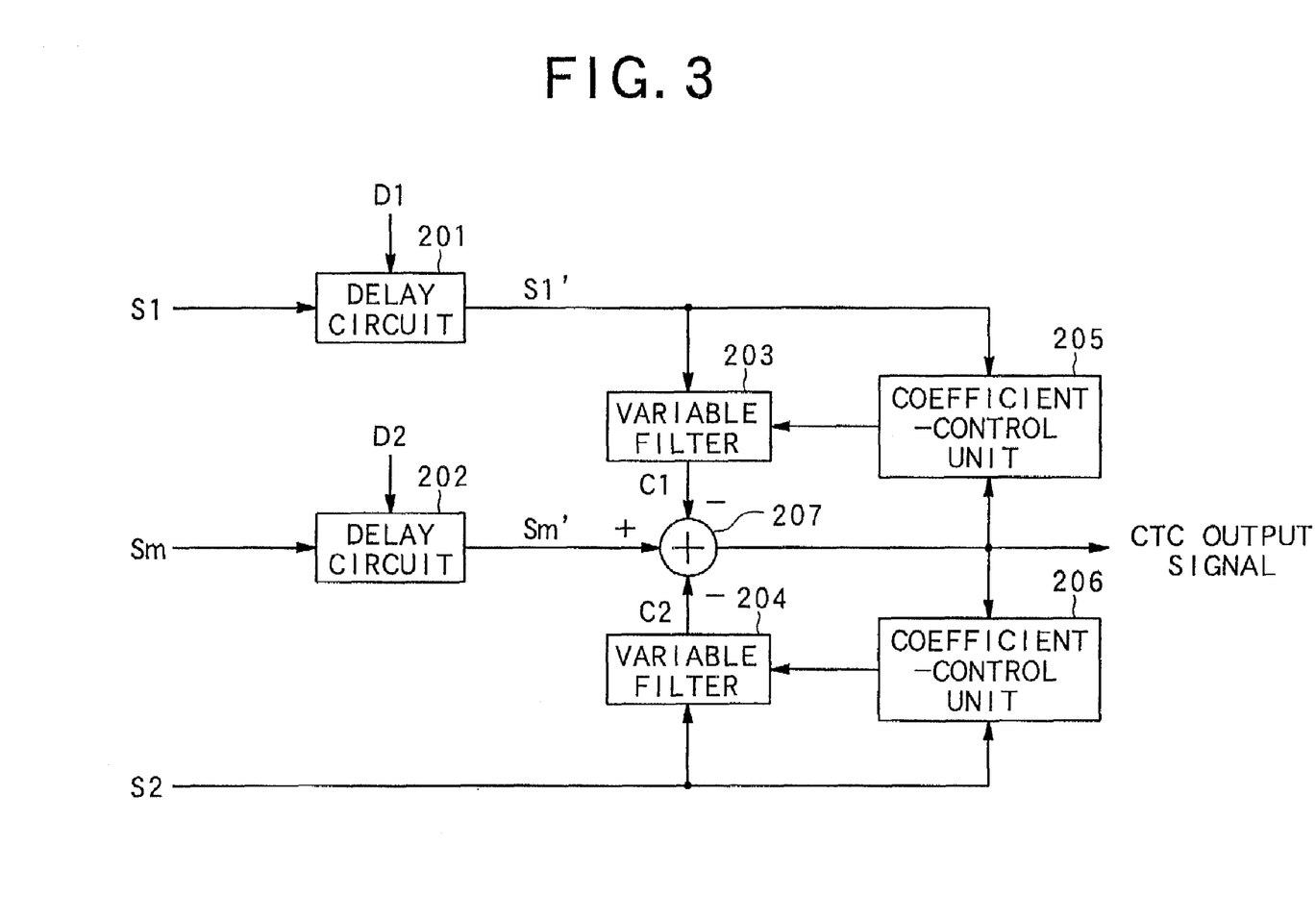
FIG. 3 is a block diagram showing the construction of the CTC unit.

Next, the construction and operation of the CTC unit 15 will be explained in detail. FIG. 3 is a block diagram showing the construction of the CTC unit 15. As shown in FIG. 3, the CTC unit 15 comprises: delay circuits 201, 202, variable filters 203, 204, coefficient-control units 205, 206 and adder/subtractor 207. With the construction shown in FIG. 3, the sample-value series S2 that corresponds to the adjacent track T2 is taken to be the reference, and the delay of the sample-value series Sm that corresponds to the main track Tm, and the delay of the sample-value series S1 that corresponds to the adjacent track T1 are corrected.

In FIG. 3, the delay circuit 201 delays the sample-value series S1 that corresponds to the adjacent track T1 by a delay amount D1 set by the CPU 16 and then outputs the series. Similarly, the delay circuit 202 delays the sample-value series Sm that corresponds to the main track Tm by a delay amount D2 set by the CPU 16, and then outputs the series. Through the operation of these delay circuits 201, 202, it is possible to properly correct the delay due to the spacing of the beam spots Sp1, Spm, Sp2 in the tangential direction of the disk.

The delay circuits 201, 202 can be constructed, for example, using FIFO memory. In other words, the sample-value series are input in order to the FIFO memory, and data are delayed by using memory space that corresponds to the delay amounts D1, D2.

The sample-value series S1' after delay correction variable filter 203 is shifted in order and input to the variable filter 203, which performs a filtering operation using a variably controlled tap coefficient, and calculates a cross-talk signal C1 that corresponds to the cross-talk component from the adjacent track T1. Moreover, the sample-value series S2 that corresponds to the adjacent track T2 is shifted in order and input to the variable filter 204, which performs a filtering operation using a variably controlled tap coefficient, and calculates a cross-talk signal C2 that corresponds to the cross-talk component from the adjacent track T2.

Next, the coefficient-control unit 205 controls the tap coefficient of the variable filter 203 in order to correspond to the change in cross-talk from the adjacent track T1. Similarly, the coefficient-control unit 206 controls the tap coefficient of the variable filter 204 in order to correspond to the change in cross-talk from the adjacent track T2. A switching instruction from the CPU 16 for switching the control frequency zone is input together with the sample-value series S1, S2 and the CTC output signal to the respective coefficient-control unit 205, 206. In this embodiment, as the coefficient-control units 205, 206 control the tap coefficient, switching control is performed for switching the control frequency zone according to the recording state of the adjacent tracks T1, T2, however that construction and operation will be described in detail later.

The adder/subtractor 207 subtracts the cross-talk signal C1, which corresponds to the adjacent track T1, and the cross-talk signal C2, which corresponds to the adjacent track T2, from the sample-value series Sm' that corresponds to the main track Tm and for which the delay has been corrected, and outputs the aforementioned CTC output signal. The CTC output signal that is obtained in this way, has been filtered by an ideal filter and is a signal from which the cross-talk components due to the adjacent tracks T1, T2 have been removed.

Figure 4:
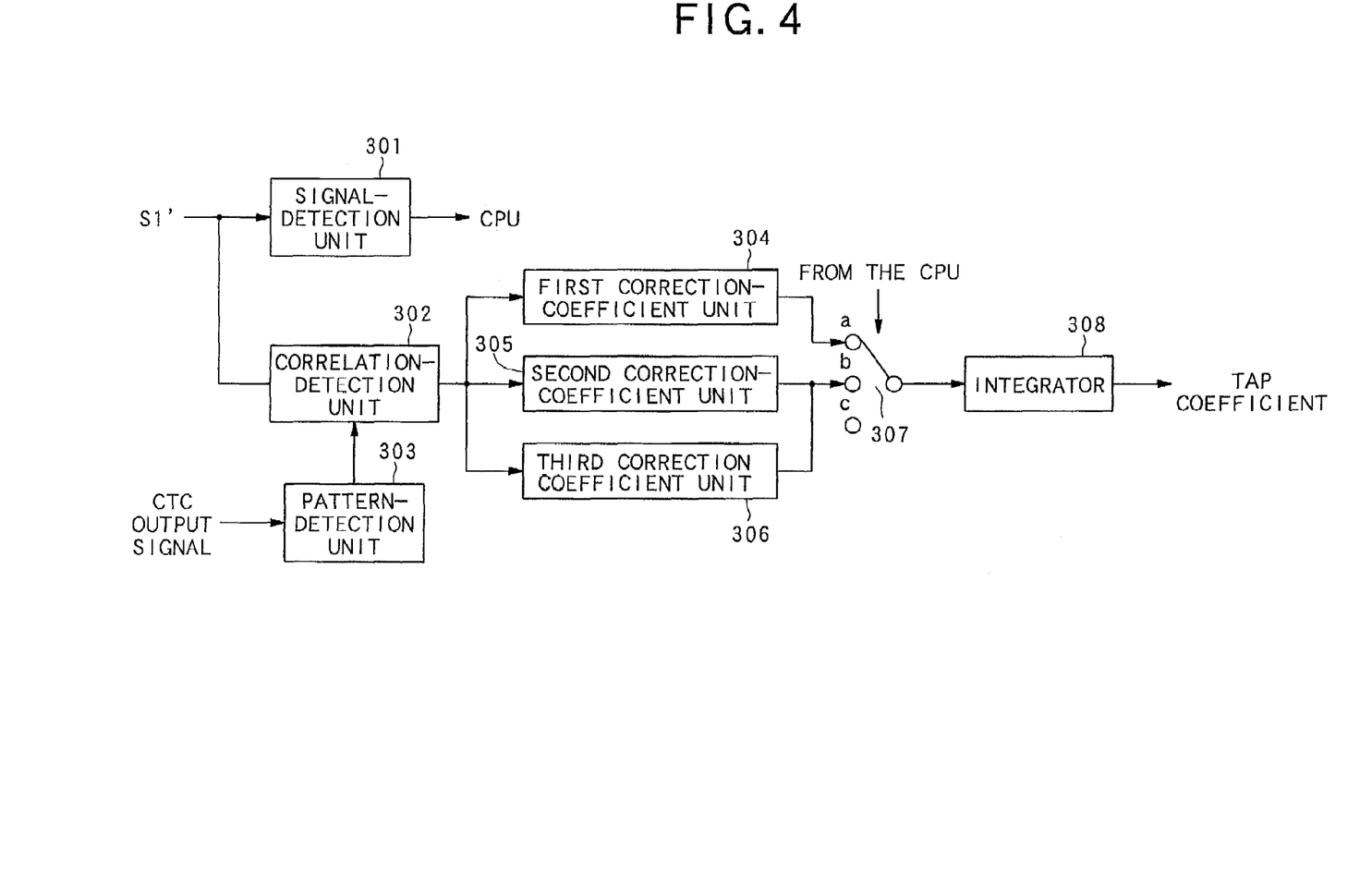
FIG. 4 is a block diagram showing the construction of the coefficient control unit of the CTC unit.

Next, the construction and operation of the coefficient-control units 205, 206 will be explained in detail. FIG. 4 is a block diagram showing the construction of the coefficient-control unit 205. As shown in FIG. 4, the coefficient-control unit 205 comprises: a signal-detection unit 301, correlation-detection unit 302, pattern-detection unit 303, first correction-coefficient unit 304, second correction-coefficient unit 305, third correction-coefficient 306, switch 307, and integrator 308. The construction and operation of the coefficient-control unit 206 is the same as that shown in FIG. 4, so only the coefficient-control unit 205 is explained below.

In FIG. 4, the signal-detection unit 301 performs signal detection in order to determine whether or not data have been recorded on the adjacent track T1 based on the sample-value series S17 after delay correction. The detection output from the signal-detection unit 301 is output to the CPU 16. It is possible to use various methods as the signal detection method for the signal-detection unit 301, for example, when the sample-value series S1' after delay correction has an amplitude with zero as the center, the amplitude level of the average absolute value of the sample-value series S1' after delay correction can be compared with a specified threshold value. In this case, the CPU 16 determines the frequency when the level exceeds the threshold value based on the detection output from the signal-detection unit 301, and finally can determine whether or not data have been recorded on the adjacent track T1.

The sample-value series S1' after delay correction is input to the correlation-detection unit 302, and it detects the correlation with the detection signal that is output from the pattern-detection unit 303. On the other hand, the pattern-detection unit 303 detects the zero-cross based on the signal pattern of the CTC output signal. With the correlation-detection unit 302, it is possible to detect the correlation by multiplying two input signals. By finding the tap coefficient by correlating the sample-value series S1' after delay correction and zero-cross of the CTC output signal in this way, and then feeding the coefficient to the variable filter 203, control is performed such that the aforementioned correlation disappears, or in other words, such that the cross-talk component is minimized.

The first correction-coefficient unit 304 multiplies the detection signal from the correlation-detection unit 302 with a first correction coefficient that corresponds to the normal control frequency zone. Moreover, the second correction-coefficient unit 305 multiplies the detection signal from the correlation-detection unit 302 with a second correction coefficient that corresponds to a control frequency zone that is wider than the normal control frequency zone. By using the first correction coefficient, convergence of the tap coefficient becomes slower, and by using the second correction coefficient, convergence of the tap coefficient becomes quicker. In order to optimize the switching operation for switching the control frequency zone (described later), it is preferred that the second correction coefficient is set such that it is about 4 times that of the first correction coefficient.

On the other hand, the third correction-coefficient unit 306 multiplies the detection signal from the correlation-detection unit 302 with a third correction coefficient that was set to zero. By using the third correction coefficient the tap coefficient does not change and the control frequency zone becomes zero.

The switch 307 performs the connection switching operation according to the switching instruction from the CPU 16. In other words, when using the normal control frequency zone, the switch 307 performs a switching operation that connects the side (a) of the output signal from the first correction-coefficient unit 304, and when using the wide control frequency zone, the switch 307 performs a switching operation that connects the side (b) of the output signal from the second correction-coefficient unit 305. Moreover, when setting the control frequency zone to zero, as will be described later, the switch 307 performs a switching operation that connects the side (c) of the output signal from the third correction-coefficient unit 306.

The CPU 16 as a rule performs control such that the first correction-coefficient unit 304 is connected, however, when it is determined based on the detection output from the signal-detection unit 301 that the state of the adjacent track T1 has changed from a non-recorded state to a recorded state, the CPU 16 performs control such that the switch 307 switches to the second correction-coefficient unit 305 at a specified timing when the control frequency zone must be widened. Also, after a specified amount of time elapses, it performs control such that the switch 307 switches again to the second correction-coefficient unit 304.

The integrator 308 integrates the output signal from the first correction-coefficient unit 304 or the output signal from second correction-coefficient unit 305 that is output via the switch 307, and smoothly outputs the changing tap coefficient. The integrator 308 comprises a low-pass filter having specified dimensions and cutoff frequency. When the dimension of the integrator 308 is one-dimensional, the ratio of two control frequency zones is proportional to the ratio of the first correction coefficient and second correction coefficient.

The tap coefficient that is obtained by the coefficient-control unit 205 as described above is supplied to the variable filter 203, and this makes it possible to properly remove the cross-talk caused by the adjacent track T1. Similarly, the tap coefficient that is obtained by the coefficient-control unit 205 is supplied to the variable filter 204, and this makes it possible to properly remove the cross-talk caused by the adjacent track T2.

Next, the switching method for switching the control frequency zone for the tap coefficient used by the CTC unit 15 during reproduction of the disk 10 will be explained. When reproducing the disk 10, the switch 307 is connected to the side of the first correction-coefficient unit 304 as the default setting for the coefficient-control units 205, 206. In this state, the CPU 16 monitors the detection output from the signal-detection unit 301 of the coefficient-control units 205, 206, and when the CPU 16 determines that the state of the adjacent track T1 or T2 changes from a non-recorded state to a recorded state, it switches the switch 307 to the side of the second correction-coefficient unit 305. In this way, it is possible to widen the control frequency zone for the tap coefficient of the CTC unit 15, and thus quicken convergence to the proper tap coefficient, and makes it possible to quickly remove the cross-talk.

On the other hand, after the control frequency zone has been widened as described above, the CPU 16 waits for a fixed amount of time, and then switches the switch 307 back to the side of the first correction-coefficient unit 304. In other words, once the coefficient becomes somewhat stable, the CPU 16 returns the control frequency zone to its original state. For example, the tap coefficient converges at about 5 times the time constant that is determined by the second correction coefficient and characteristics of the integrator 308, so this can be set as the fixed amount of time mentioned above. After the switch has been switched back, the control frequency zone for the tap coefficient of the CTC unit 15 becomes narrow, and the tap coefficient once again changes gradually.

When the CPU 16 monitors the detection output from the signal-detection unit 301 of the coefficient-control units 205, 206 and determines that the state of the adjacent track T1 or T2 has changed from a recorded state to a non-recorded state, the CPU 16 switches the switch 307 to the side of the third coefficient-correction unit 306. By doing so the control frequency zone for the tap coefficient of the CTC unit 15 becomes zero and the cross-talk canceller stops operating. In the normal reproduction state, when there are no data recorded on the adjacent tracks T1, T2, the cross-talk from the adjacent tracks T1, T2 is mostly zero, so the tap coefficient converges to zero even when the cross-talk canceller is operated using the first correction coefficient for the normal zone. However, there is a possibility that the tap coefficient could malfunction due to defects or the like, so when the adjacent tracks T1, T2 are in a non-recorded state, operation of the cross-talk canceller becomes stable by stopping the operation of the cross-talk canceller. When the tap coefficient becomes large due to malfunction, disk noise from the adjacent tracks T1, T2 is added, and there is a possibility that the signal from the main track Tm could become poor.

In the explanation above, the case of using the third correction coefficient (zero) when the adjacent tracks T1, T2 are in the non-recorded state was explained, however the tap coefficient of the CTC unit 15 could also be reset to zero.

By controlling the control frequency zone for the tap coefficient used by the CTC unit 15 in this way, it is possible to follow the state of the adjacent tracks and very optimally maintain the ability to remove cross-talk, even when there are mixed recorded and non-recorded sections on the disk 10. Here, the timing for widening the control frequency zone for the tap coefficient is only for a short time at the beginning of a recorded area, so it is possible to stably control the tap coefficient without being affected by defects, and thus it is possible to stably remove the cross-talk.

In the embodiment above, the case of applying the invention to a data reproduction apparatus that reproduces data on an optical disk that corresponds to DVD format, such as a DVD-ROM, was explained, however, the invention is not limited to this, and it is possible to widely apply to the invention to a data reproduction apparatus that uses data recording media of other formats capable of recording data.

In the explanation above, the signal-detection unit 301 determines from the sample-value series S1' after delay correction whether or not data have been recorded on the adjacent tracks T1, T2, however, since this method takes a little time to perform signal detection, it is also possible to determine from the sample-value series S1 before delay correction whether or not data have been recorded on the adjacent tracks T1, T2.

Also, in the embodiment described above, the case of applying the invention to construction using a light beam that is separated into three light beams was explained, however, the invention is not limited to this, and it is possible, for example, to apply the invention to construction using a light beam that is separated into five light beams.

According to the invention explained above, when reproducing data from a recordable data-recording medium, switching of the control frequency zone for the tap coefficient of a variable filter is controlled according to the recording state of the adjacent tracks even when the adjacent tracks change to a non-recorded state, so a cross-talk removal apparatus that is capable of preventing malfunction while quickly removing the cross-talk, and obtaining a good reproduction signal is possible.

The entire disclosure of Japanese Patent Application No. 2001-131620 filed on Apr. 27, 2001 including the specification, claims, drawings and summary is incorporated herein by reference in its entirety.

What is claimed is:

1. A cross-talk removal apparatus that removes cross-talk from one or the other or both adjacent tracks, which is contained in the reproduction signal from a main track on a data-recording medium that is to be reproduced, based on the reproduction signal from said main track and the reproduction signals from said one or the other or both adjacent tracks and comprising:

a cross-talk removal device of using a variable filter with a controllable coefficient to extract the cross-talk from the reproduction signal of said one or the other or both adjacent tracks and removing said cross-talk from the reproduction signal of said main track;

a coefficient control device of controlling the coefficient of said variable filter using a changeable control frequency zone; and a control frequency zone setting device of determining the recording state of said one or the other or both adjacent tracks and switching said control frequency zone according to said recording state, wherein said control frequency zone setting device sets said control frequency zone to be wide for a specified period of time when the recording state of said one or the other or both adjacent tracks changes from an non-recorded state to a recorded state.

2. The cross-talk removal apparatus of claim 1 wherein said coefficient control device is capable of switching said control frequency zone between a first control frequency zone and a second control frequency zone that is wider than said first control frequency zone, and wherein said control frequency zone setting device normally sets said first control frequency zone, and sets said second control frequency zone for a specified period of time when the recording state of said one or the other or both adjacent tracks changes from an non-recorded state to a recorded state.

3. The cross-talk removal apparatus of claim 2 wherein said specified period of time is the time required for said coefficient to converge when said second control frequency zone has been set.

4. The cross-talk removal apparatus of claim 1 wherein said control frequency zone setting device determines the recorded state and non-recorded state based on the amplitude of the reproduction signals from said one or the other or both adjacent tracks.

5. The cross-talk removal apparatus of claim 1 wherein said control frequency zone setting device sets said control frequency zone to zero when the recording state of said one or the other or both adjacent tracks changes from a recorded state to a non-recorded state.

6. A data reproduction apparatus that reproduces recorded data from a data-recording medium on which tracks are formed and comprising:

a reproduction device of generating a reproduction signal for a main track to be reproduced and the reproduction signals of one or the other or both adjacent tracks based on light that is reflected when said main track and said one or the other or both adjacent tracks are irradiated with a light beam;

a cross-talk removal device of using a variable filter with a controllable coefficient to extract the cross-talk from the reproduction of said one or the other or both adjacent tracks and removing said cross-talk from the reproduction signal of said main track;

a coefficient control device of controlling the coefficient of said variable filter using a changeable control frequency zone; and a control frequency zone setting device of determining the recording state of said one or the other or both adjacent tracks and switching said control frequency zone according to said recording state, wherein said control frequency zone setting device sets said control frequency zone to be wide for a specified period of time when the recording state of said one or the other or both adjacent tracks changes from an non-recorded state to a recorded state.

7. The data reproduction apparatus of claim 6 wherein said coefficient control device is capable of switching said control frequency zone between a first control frequency zone and a second control frequency zone that is wider than said first control frequency zone, and wherein said control frequency zone setting device normally sets said first control frequency zone, and sets said second control frequency zone for a specified period of time when the recording state of said one or the other or both adjacent tracks changes from an non-recorded state to a recorded state.

8. The data reproduction apparatus of claim 7 wherein said specified period of time is the time required for said coefficient to converge when said second control frequency zone has been set.

9. The data reproduction apparatus of claim 6 wherein said control frequency zone setting device determines the recorded state and non-recorded state based on the amplitude of the reproduction signals from said one or the other or both adjacent tracks.

10. The data reproduction apparatus of claim 6 wherein said control frequency zone setting device sets said control frequency zone to zero when the recording state of said one or the other or both adjacent tracks changes from a recorded state to a non-recorded state.

* * * * *